US009790958B2

(12) United States Patent
Colson et al.

(10) Patent No.: US 9,790,958 B2
(45) Date of Patent: Oct. 17, 2017

(54) HOUSING FOR AIR CYCLE MACHINE COMPRESSOR

(71) Applicant: HAMILTON SUNDSTRAND CORPORATION, Windsor Locks, CT (US)

(72) Inventors: Darryl A. Colson, West Suffield, CT (US); Brent J. Merritt, Southwick, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 198 days.

(21) Appl. No.: 14/883,130

(22) Filed: Oct. 14, 2015

(65) Prior Publication Data

US 2017/0108005 A1   Apr. 20, 2017

(51) Int. Cl.
| | | |
|---|---|---|
| *B64D 13/06* | (2006.01) |
| *F04D 29/52* | (2006.01) |
| *B64D 13/02* | (2006.01) |
| *B64D 13/08* | (2006.01) |
| *F04D 29/42* | (2006.01) |
| *F04D 29/44* | (2006.01) |
| *F04D 29/54* | (2006.01) |
| *F04D 25/04* | (2006.01) |

(52) U.S. Cl.
CPC .......... *F04D 29/522* (2013.01); *B64D 13/02* (2013.01); *B64D 13/08* (2013.01); *F04D 25/04* (2013.01); *F04D 29/4206* (2013.01); *F04D 29/441* (2013.01); *F04D 29/545* (2013.01); *B64D 2013/0603* (2013.01); *F05D 2250/73* (2013.01); *F05D 2260/30* (2013.01)

(58) Field of Classification Search
CPC .. F04D 27/009; F04D 29/4206; F04D 29/422; F01D 25/243; F01D 25/24; B64D 2013/0647; F05D 2260/606
See application file for complete search history.

(56) References Cited

U.S. PATENT DOCUMENTS

2013/0287555 A1* 10/2013 Rosen ................... F04D 17/122
                                                         415/182.1
2014/0030080 A1*  1/2014 Chrabascz ............ F01D 25/285
                                                         415/203

FOREIGN PATENT DOCUMENTS

JP           410176699 A  *  6/1998

* cited by examiner

*Primary Examiner* — Woody Lee, Jr.
*Assistant Examiner* — Sabbir Hasan
(74) *Attorney, Agent, or Firm* — Cantor Colburn LLP

(57) ABSTRACT

A housing of an air cycle machine compressor is provided. The housing includes a body defining an aperture therethrough and one or more bosses located circumferentially around the body, the body having a general wall thickness. A duct is configured on a portion of the body. The body includes a first angle defining an area extending over a circumferential direction of the body having a first wall thickness different from the general wall thickness. The first angle is configured with the first wall thickness having a ratio of 1.565 as compared to the general wall thickness.

16 Claims, 6 Drawing Sheets

HOUSING FOR AIR CYCLE MACHINE COMPRESSOR

BACKGROUND

The subject matter disclosed herein generally relates to air cycle machines and, more particularly, to housing for air cycle machine compressors.

Air cycle environmental control systems may be used on aircraft for conditioning air, which may include pressuring, cooling, and dehumidifying the air. The air may then be delivered to the aircraft passenger cabin and crew cockpit for occupant comfort. The conditioned air may also be supplied to the equipment bay for cooling sensitive equipment.

Air cycle environmental control systems generally employ an air cycle machine comprised of a fan, a compressor, and one or more turbines mounted for rotation on a common shaft. The turbines are configured to drive both the compressor and the fan. The air cycle machine is typically powered by compressed air which is bled from a compressor section of an engine or an auxiliary power unit. The compressed bleed air is further compressed in the compressor of the air cycle machine and thereafter expanded through the turbine or turbines thereby cooling the air and generally condensing moisture therein. The bleed air is also typically cooled prior to compression by passing it in heat exchange relationship with cold air, most commonly ram air from the atmosphere outside the aircraft, drawn through the heat exchanger by the fan of the air cycle machine. The air may be further cooled between the compression and expansion steps by again passing it in heat exchange relationship with the cold ram air. The air that has been expanded through the turbine constitutes the conditioned air that is delivered to the aircraft cabin, cockpit, and equipment bays.

SUMMARY

According to one embodiment, a housing of an air cycle machine compressor is provided. The housing includes a body defining an aperture therethrough and one or more bosses located circumferentially around the body, the body having a general wall thickness. A duct is configured on a portion of the body. The body includes a first angle defining an area extending over a circumferential direction of the body having a first wall thickness different from the general wall thickness. The first angle is configured with the first wall thickness having a ratio of 1.565 as compared to the general wall thickness.

According to another embodiment, a housing of an air cycle machine compressor is provided. The housing includes a body defining an aperture therethrough and one or more bosses located circumferentially around the body, the body having a defined general fillet radius. A duct is configured on a portion of the body. The body includes a first fillet radius having a fillet radius different from the general fillet radius. The first fillet radius is configured with the first fillet radius having a ratio of four as compared to the general fillet radius.

Technical effects of embodiments of the present disclosure include a housing for an air cycle machine compressor that is configured to address high stress due to increased load on the air cycle machine compressor and/or high stress on the housing. Further technical effects include an improved air cycle machine compressor housing with minimal impact on the weight of the air cycle machine compressor.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
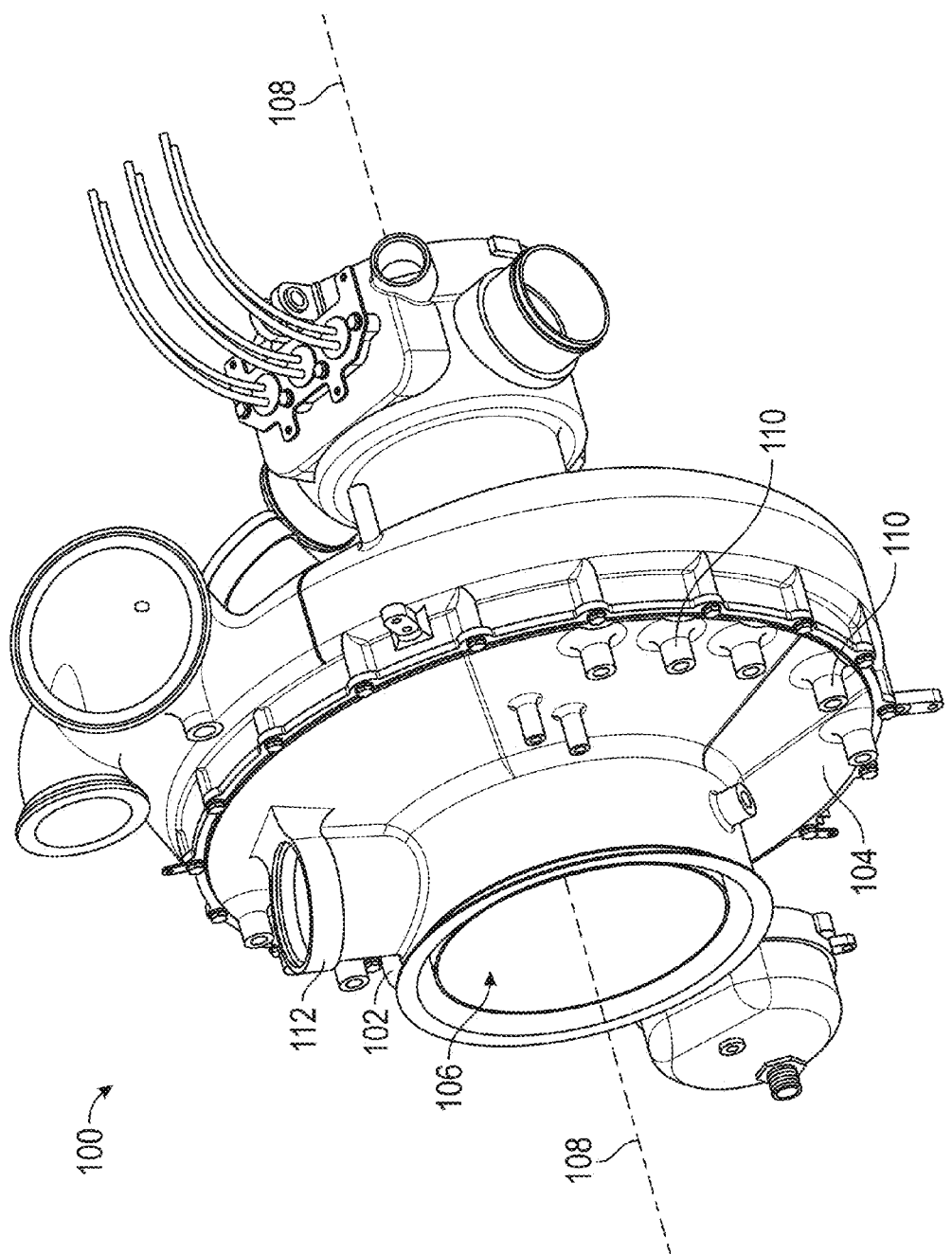
FIG. 1 is an isometric schematic view of an air cycle machine compressor in accordance with an embodiment of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is an isometric schematic illustration of an air cycle machine compressor 100 in accordance with an embodiment. The air cycle machine compressor 100 includes various components, as known in the art, and specifically includes a housing 102. In some embodiments, the housing 102 may be configured as an add-heat housing for an air cycle machine compressor. The housing 102 may be configured with specific wall thicknesses and/or fillet radii such that the component may be configured to address high stresses. For example, in some embodiments, various wall thicknesses and/or fillet radii may be configured to address high stress due to increased aircraft maneuver loads when the air cycle machine compressor is installed in an aircraft.

The housing 102 may be formed by a body 104 that defines an aperture 106 therein. The aperture 106, and body 102, has an axis 108 defining a center of the aperture 106 and passing through an axis of the air cycle machine compressor 100. Disposed on the body 104 may be one or more bosses 110. Further, the body 104 may include a duct 112.

Figure 2A:
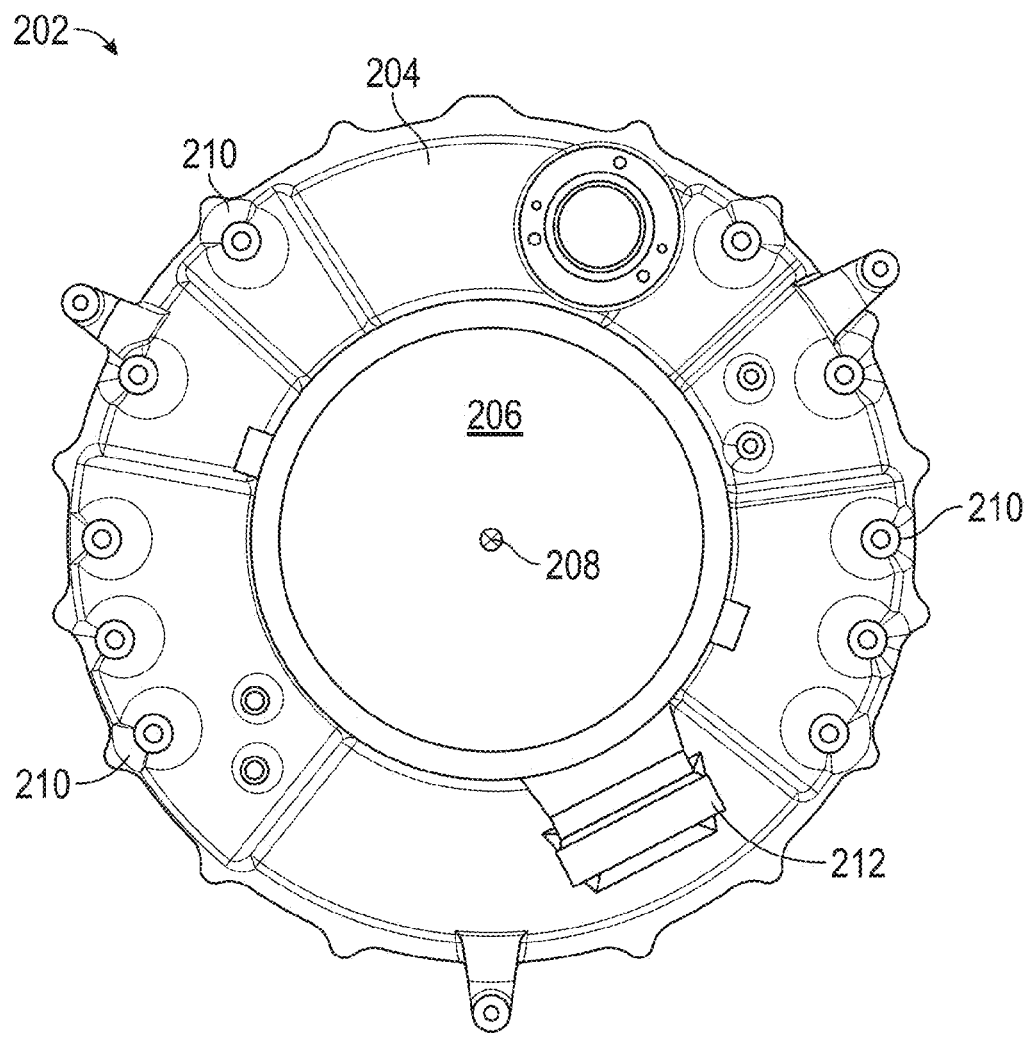
FIG. 2A is a plan schematic view of a housing of a housing for an air cycle machine compressor in accordance with an embodiment of the present disclosure.

Turning now to FIG. 2A, a plan view of a housing 202 is shown. Similar to that shown in FIG. 1, the housing includes a body 204 having a generally circular shape. The body 204 may be formed of various parts having a variety of wall thicknesses, with the body 204 having a general wall thickness $T_G$, unless otherwise specified. The body 204 defines an aperture 206 therein and has an axis 208 defining a center of the aperture 206. Disposed on the body 204 may be one or more bosses 210 and a duct 212.

Figure 2B:
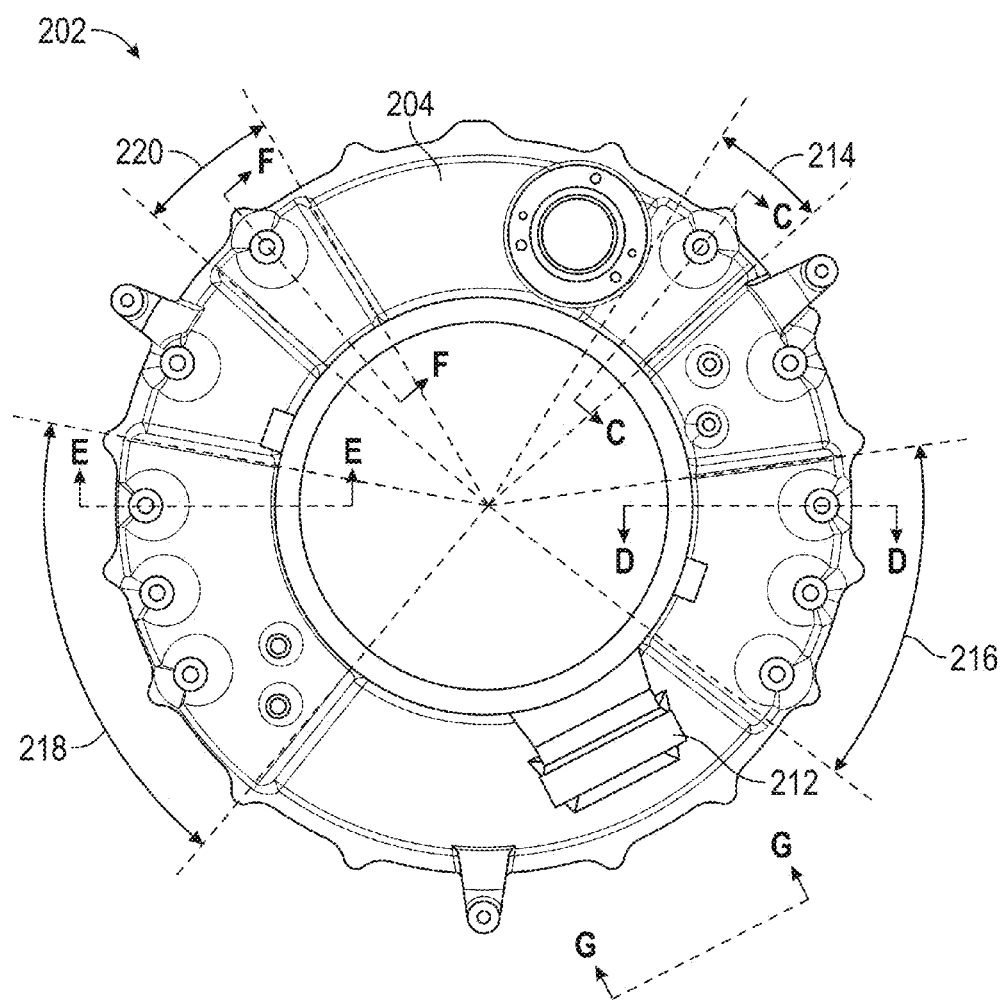
FIG. 2B is the plan schematic view shown in FIG. 2A with various views indicated thereon.

Turning now to FIG. 2B, the same housing 202 is shown, however, various view-markers, e.g., indicating cross-sectional views, are indicated along with accompanying arc-length indicators. As shown, cross-sectional views C-C, D-D, E-E, and F-F are indicated along with a view G-G of the duct 212. The various views are discussed with corresponding FIGS. 2C, 2D, 2E, 2F, and 2G, respectively.

Figure 2C:
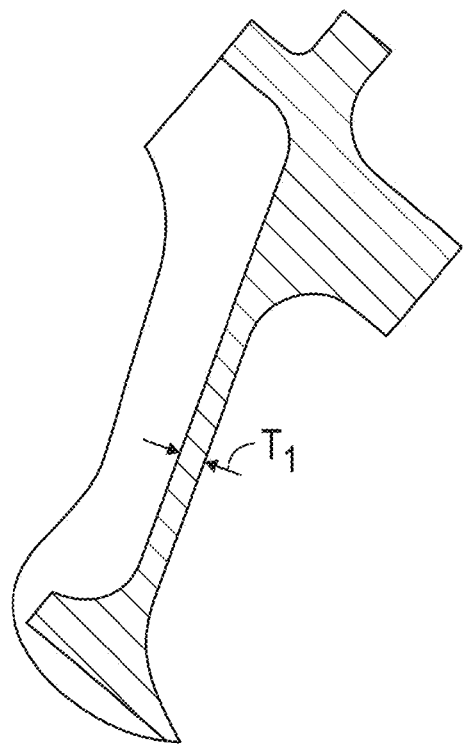
FIG. 2C is a cross-section schematic view of the housing of FIG. 2A along the line C-C indicated in FIG. 2B.
Figure 2D:
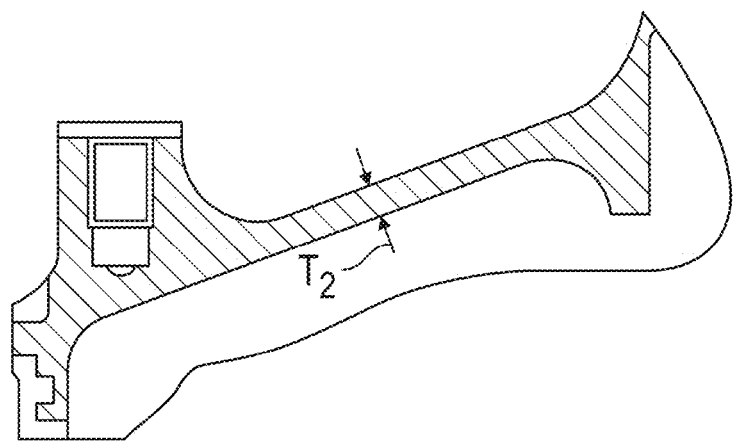
FIG. 2D is a cross-section schematic view of the housing of FIG. 2A along the line D-D indicated in FIG. 2B.
Figure 2E:
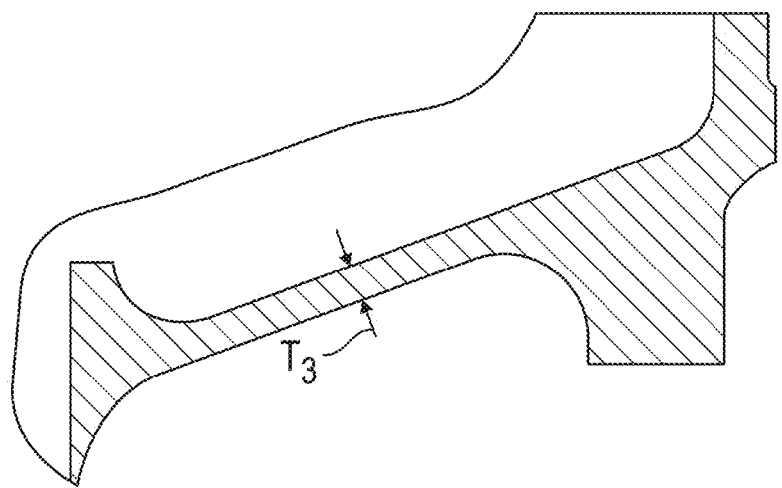
FIG. 2E is a cross-section schematic view of the housing of FIG. 2A along the line E-E indicated in FIG. 2B.
Figure 2F:
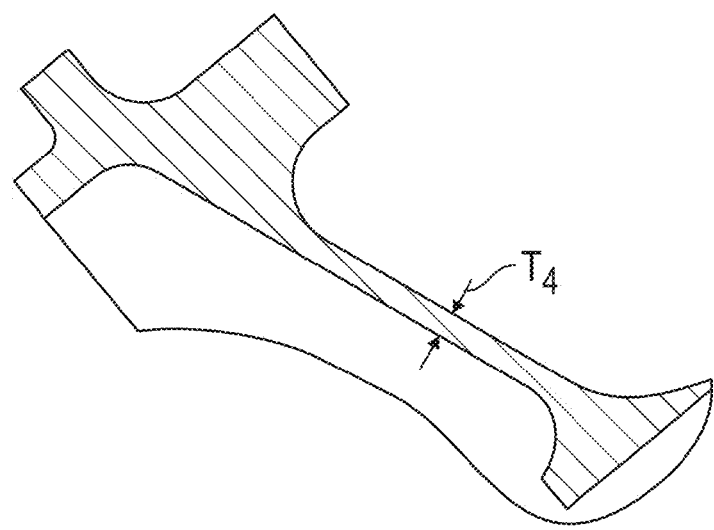
FIG. 2F is a cross-section schematic view of the housing of FIG. 2A along the line F-F indicated in FIG. 2B.

Cross section C-C, shown in FIG. 2C, represents a wall thickness of the body 204 over a first angle 214. Cross section D-D, shown in FIG. 2D, represents a wall thickness of the body 204 over a second angle 216. Cross section E-E, shown in FIG. 2E, represents a wall thickness of the body 204 over a third angle 218. Cross section F-F, shown in FIG. 2F, represents a wall thickness of the body 204 over a fourth angle 220. As shown, the angles 214, 216, 218, 220 are the circumferential extents of the body 204 about various ones of the bosses 210. Portions of the body 204 not included in the angles 214, 216, 218, 220 will have the general wall thickness $T_G$. As appreciated by those of skill in the art, the angles used herein define an area of a circular shaped body 204 and represent an area of the body 204 that has a particular thickness for the extent of the angle in the circumferential direction.

As shown in FIGS. 2C-2F, the first angle 214 has a first wall thickness of $T_1$; the second angle 216 has a second wall thickness of $T_2$; the third angle 218 has a third wall thickness of $T_3$; and the fourth angle 220 has a fourth wall thickness $T_4$.

In one non-limiting embodiment, the general wall thickness $T_G$ of the housing 202 may be 0.115±0.020 inches (0.292±0.051 cm). The body 204 may have a first wall thickness $T_1$ may be 0.180±0.020 inches (0.457±0.051 cm). Further, the body 204 may have a second wall thickness $T_2$ may be 0.250±0.020 inches (0.635±0.051 cm). Further, the body 204 may have a third wall thickness $T_3$ may be 0.200±0.020 inches (0.508±0.051 cm). Further, the body 204 may have a fourth wall thickness $T_4$ may be 0.200±0.020 inches (0.508±0.051 cm). Those of skill in the art will appreciate that combinations of the above described wall thickness may be employed in a housing without departing from the scope of the present disclosure. For example, in some embodiments $T_G=T_2=T_3=T_4$, and only the first wall thickness $T_1$ may vary from the general wall thickness $T_G$. Other combinations are contemplated and will be appreciated by those of skill in the art.

Further, in some embodiments, the wall thicknesses of the various angles 214, 216, 218, 220 may be configured based on a ratio of thickness as compared to the general wall thickness $T_G$. For example, in some embodiments, the first angle 214 may have a wall thickness with a ratio of $T_1/T_G=1.565$. In some embodiments, the second angle 216 may have a wall thickness with a ratio of $T_2/T_G=2.174$. In some embodiments, the third angle 218 may have a wall thickness with a ratio of $T_3/T_G=1.739$. In some embodiments, the fourth angle 220 may have a wall thickness with a ration of $T_4/T_G=1.739$.

Figure 2G:
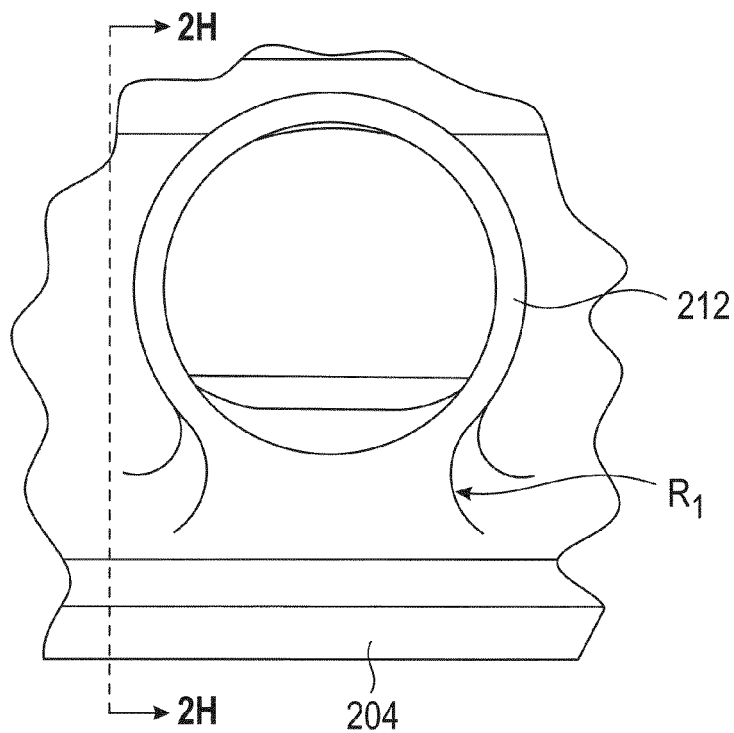
FIG. 2G is partial schematic view of a portion the housing of FIG. 2A along the line G-G indicated in FIG. 2B.
Figure 2H:
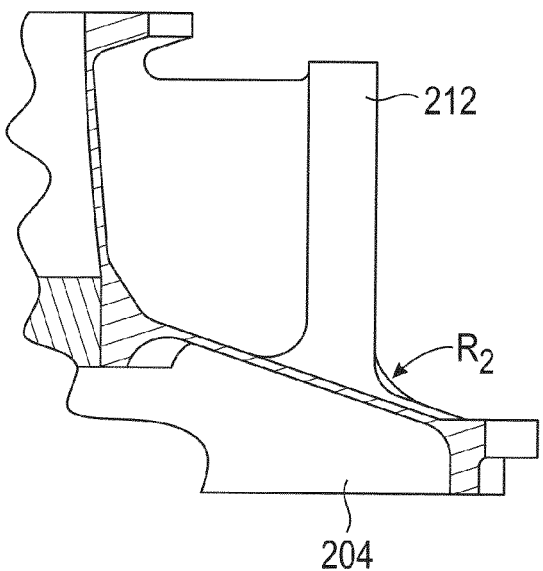
FIG. 2H is a side schematic view of the portion of the housing shown in FIG. 2G along the line H-H.

Turning now to FIG. 2G, a view of the duct 212 from the line G-G of FIG. 2B is shown. Further, FIG. 2H shows a side view of the duct 212 from the line H-H shown in FIG. 2G. FIGS. 2G and 2H indicate a first fillet radius $R_1$ and a second fillet radius $R_2$ about a base of the duct 212, where the duct 212 intersects with the body 204. Similar to the wall thicknesses described above, the body 204 may include a general fillet radius $R_G$ that is used for all fillet radii, unless otherwise specified.

In a non-limiting embodiment, the general fillet radius $R_G$ of the body 204 may be 0.125±0.030 inches (0.318±0.076 cm). The duct 212 of the body 204 may have a first fillet radius $R_1$ of 0.500±0.030 inches (1.270±0.076 cm). Further, the duct 212 of the body 204 may have a second fillet radius $R_2$ of 0.500±0.030 inches (1.270±0.076 cm).

Further, in some embodiments, the fillet radii at the base of the duct 212 may be configured based on a ratio of a fillet radius as compared to the general fillet radius $R_G$. For example, in some embodiments, the first fillet radius $R_1$ may have a fillet radius with a ratio of $R_1/R_G=4.000$. In some embodiments, the second fillet radius $R_2$ may have a fillet radius with a ratio of $R_2/T_G=4$.

Advantageously, embodiments described herein provide a housing for an air cycle machine compressor having wall thickness and fillet radii configured to address high stress due to increased loads on the air cycle machine compressor and/or the housing itself. Further, advantageously, wall thicknesses may be increased over a general wall thickness only where required such that a weight impact on the weight of the air cycle machine compressor may be minimally impacted.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A housing of an air cycle machine compressor, the housing comprising:
   a body defining an aperture therethrough and one or more bosses located circumferentially around the body, the body having a general wall thickness; and
   a duct configured on a portion of the body;
   wherein the body includes a first angle defining an area extending over a circumferential direction of the body having a first wall thickness different from the general wall thickness,
   wherein the first angle is configured with the first wall thickness having a ratio of 1.565 as compared to the general wall thickness.

2. The housing of claim 1, wherein the first angle has a wall thickness of 0.180±0.020 inches.

3. The housing of claim 1, wherein the body includes a second angle defining an area extending over a circumferential direction of the body having a second wall thickness that is different from the general wall thickness, wherein the second angle is configured with the second wall thickness having a ratio of 2.174 as compared to the general wall thickness.

4. The housing of claim 3, wherein the second wall thickness is 0.250±0.020 inches.

5. The housing of claim 1, wherein the body includes a third angle defining an area extending over a circumferential direction of the body having a third wall thickness that is different from the general wall thickness, wherein the third angle is configured with the third wall thickness having a ratio of 1.739 as compared to the general wall thickness.

6. The housing of claim 5, wherein the third wall thickness is 0.200±0.020 inches.

7. The housing of claim 1, wherein the body includes a fourth angle defining an area extending over a circumferential direction of the body having a fourth wall thickness that is different from the general wall thickness, wherein the fourth angle is configured with the fourth wall thickness having a ratio of 1.739 as compared to the general wall thickness.

8. The housing of claim 5, wherein the fourth wall thickness is 0.200±0.020 inches.

9. The housing of claim 1, wherein the body includes a defined general fillet radius, and wherein the duct has a first fillet radius at a base connecting to the body, the first fillet radius having a fillet radius with a ratio of four as compared to the general fillet radius.

10. The housing of claim 9, wherein the first fillet radius is 0.500±0.030 inches.

11. The housing of claim 1, wherein the body includes a defined general fillet radius, and wherein the duct has a second fillet radius at a base connecting to the body, the second fillet radius having a fillet radius with a ratio of four as compared to the general fillet radius.

12. The housing of claim 11, wherein the second fillet radius is 0.500±0.030 inches.

13. A housing of an air cycle machine compressor, the housing comprising:
 a body defining an aperture therethrough and one or more bosses located circumferentially around the body, the body having a defined general fillet radius; and
 a duct configured on a portion of the body;
 wherein the body includes a first fillet radius having a fillet radius different from the general fillet radius,
 wherein the first fillet radius is configured with the first fillet radius having a ratio of four as compared to the general fillet radius.

14. The housing of claim 13, wherein the first fillet radius is 0.500±0.030 inches.

15. The housing of claim 13, wherein the body includes a defined general fillet radius, and wherein the duct has a second fillet radius at a base connecting to the body, the second fillet radius having a fillet radius with a ratio of four as compared to the general fillet radius.

16. The housing of claim 15, wherein the second fillet radius is 0.500±0.030 inches.

\* \* \* \* \*